Patented Feb. 26, 1946

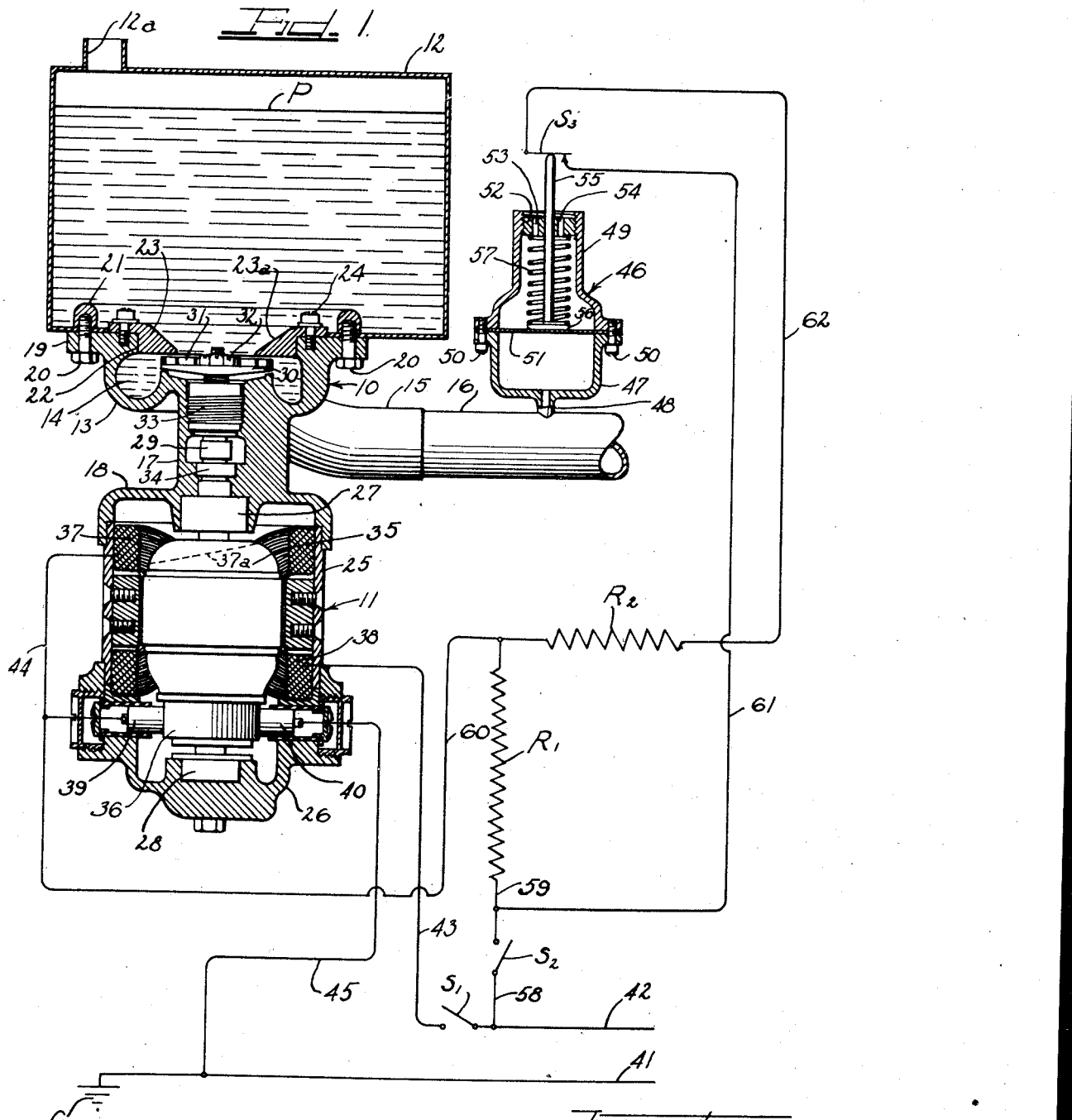

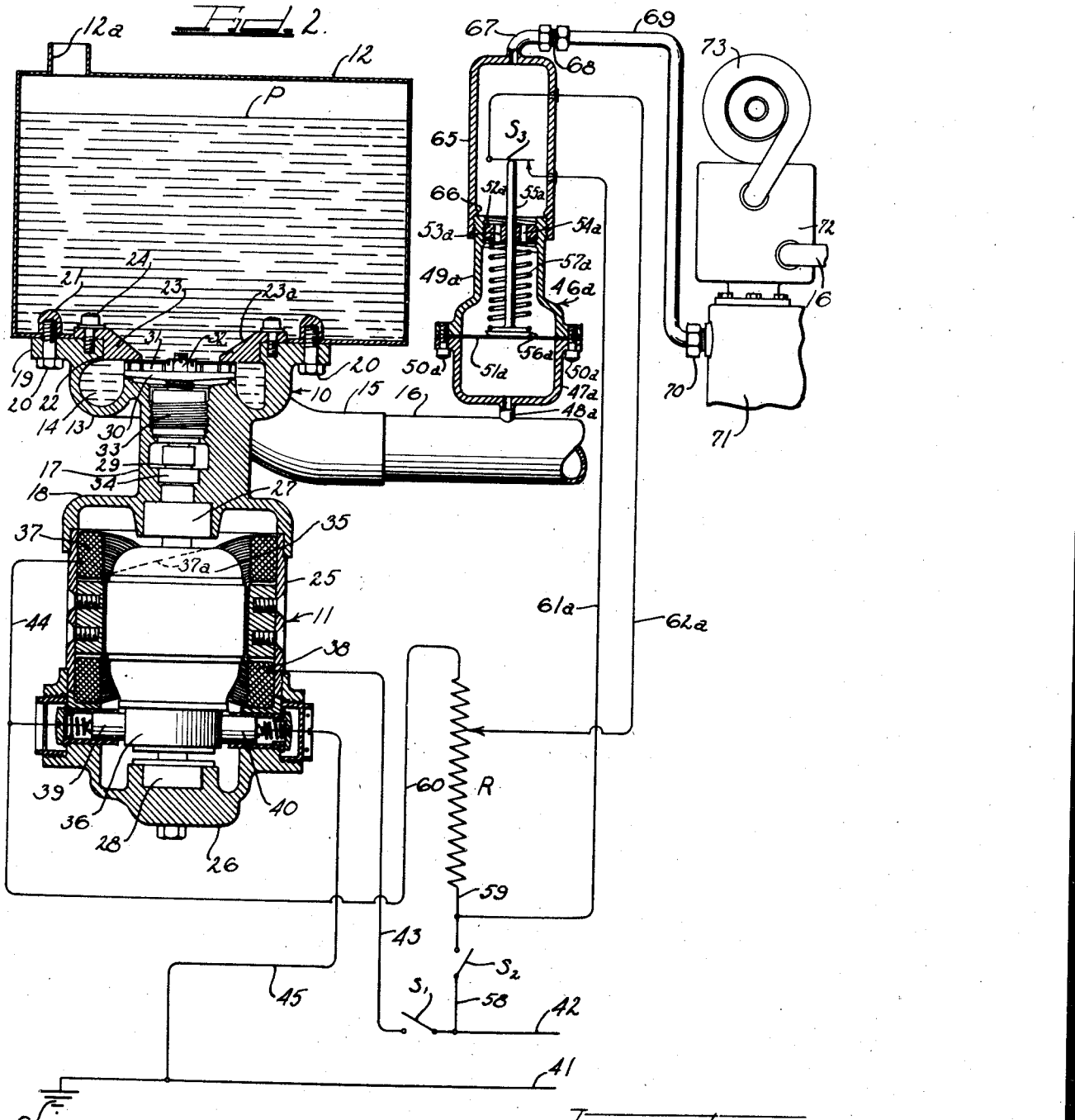

2,395,657

UNITED STATES PATENT OFFICE 2,395,657

AUTOMATIC PRESSURE CONTROL FOR BOOSTER PUMPS

Theodore Robert Dinsmore and James Aitken Thompson, Dayton, Ohio, assignors to Curtis Pump Company, Dayton, Ohio, a corporation of Ohio Application March 20, 1942, Serial No. 435,460

5 Claims. (Cl. 103—35)

The present invention relates to pump control systems especially adapted for use in aircraft fuel systems.

More specifically, the invention relates to a variable speed electric motor driven centrifugal pump assembly in combination with an electrical and mechanical system operative to automatically vary the pump motor speed for preventing development of excessive pressures in the pump and discharge line from the pump.

In accordance with this invention, a motor-driven booster pump is connected to a source of fuel supply from which the liquid fuel is pumped under pressure to a delivery line. Inasmuch as the booster pump is particularly adapted for use with aircraft fuel systems including an aircraft engine driven main fuel pump receiving pressured fuel from the booster pump, the motor driving the pump is energized to rotate the impeller at such a speed as to effect a predetermined discharge pressure. The booster pump, in such systems, will beat out bubbles of gas and vapor from the fuel and pressure the bubble freed fully liquid fuel to the main pump which in turn delivers the fuel to the engine carburetor. The fuel can be by-passed around the main pump in the event of failure of the main pump. When the booster pump is required to perform emergency duties through failure of the main or engine-driven fuel pump, it is necessary that the impeller speed be increased to effect an increase of pressure in the discharge line.

However, such an increase in the discharge pressure should be confined within narrow limits and be held substantially constant within these limits to insure good carburetor performance.

This increase in discharge pressure to a predetermined maximum is effected by a mechanism inserted in the discharge line to control an electrical switch and resistance assembly whereby the speed of the driving motor for the pump is regulated in accordance with the pressure in the discharge line.

It is, then, an object of this invention to provide a pressure-responsive speed control for a pump.

A further object of this invention is the provision of a pressure-responsive speed control for a booster pump whose discharge pressures are adjustable between predetermined limits but which are maintained substantially constant at those limits.

Another object of the present invention is the provision of electrical and mechanical control devices for an electric motor driven pump.

Another and further object of this invention is the provision, in a motor-driven pump, of means for regulating the speed of rotation of the pump by its discharge pressure.

A still further object of the present invention is the provision, in a motor-driven fuel pump, of control means sensitive to the discharge pressures of the pump and an electrical system operated by the control means to regulate the speed of the rotation of the motor-driven pump.

Still another object of this invention is the provision, in an electric motor-driven pump, of a pressure sensitive switch operable by the discharge pressure of the pump and controlling a resistance circuit for the electric motor to regulate the motor speed by the pressure of the discharge from the pump.

A further object of this invention is the provision of a fuel pump having an electric driving motor with an electrical circuit through which the motor is energized to rotate at a speed to effect a predetermined constant discharge pressure from the pump and with another electrical circuit having resistance means therein through which the flow of electricity is controlled by a pump pressure operated switch whereby said pump is energized through said other circuit to increase the speed of the motor and the discharge pressure of the pump to a predetermined constant value.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a vertical cross-sectional view, with parts in elevation, illustrating the combination of a source of fuel, a pump, a motor for driving the pump, a switch mechanism operable by the discharge of the pump, and electrical circuits through which the motor is energized for driving the pump at speeds for effecting different, but relatively constant, discharge pressures of the pump; and Figure 2 is a view similar to Figure 1 illustrating a different arrangement of switch mechanism and electrical circuits for energizing the motor.

In Figure 1, the reference numeral 10 designates a booster pump of the centrifugal type driven by an electric motor 11. The pump and motor assembly is suspended on a fuel tank 12, vented as at 12a, containing a pond P of liquid fuel such as gasoline.

The centrifugal type booster pump 10 includes a casing 13 defining a pump chamber 14, a discharge outlet 15 connecting the pump chamber to a delivery line 16, a driving shaft housing 17, and a motor support portion 18. The pump casing has an outturned annular flange 19 by which the pump is mounted on a wall of the fuel tank 12. It is preferred that the pump 10 be mounted on the bottom wall of the tank in order to be below the hydraulic gradient of the liquid. The bottom wall of the tank is apertured and the pump casing is mounted therearound by means of screws 20 at spaced intervals circumferentially of the mounting flange 19, which screws are threaded into blind tapped walls in a mounting ring 21. The mounting ring may be welded, soldered, or otherwise secured to the bottom wall of the tank.

The casing defines a circular opening 22 into which a throat ring 23 is seated. The throat ring 23 partially overlies the flange 19 and bolts 24, at spaced intervals around the throat ring, are threaded through the ring into the flange portion to mount the ring on the casing 13. The throat ring has a central aperture which flares outwardly as at 23a to provide an inlet mouth for the boster pump whereby the interior of the tank 12 is joined with the pump chamber 14.

The electric motor 11 by which the pump is driven includes a casing 25 which is connected to and depends from the motor support portion 18 on the pump. An end casing member 26 is connected to the opposite end of the motor casing 25.

A bearing 27 in the pump casing portion 18 is in alignment with a bearing 28 carried by the end casing 26 for receiving therethrough the driving shaft 29.

At the upper end of the driving shaft 29, there is provided an impeller assembly including a disk 30 and upstanding curved vanes 31 thereon, which assembly spans the inlet as defined by the throat ring and communicates freely around the periphery thereof with the inner rim of the pumping chamber 14. Portions of the vanes underlap the throat ring to be covered thereby while the inner portions of the vanes are uncovered and exposed in the inlet. The impeller assembly may be mounted on the driving shaft in any suitable manner, such as by a nut 32 threaded to the end of the shaft as shown. Seal constructions 33 and 34 surround the shaft 29 within the shaft housing 17 to seal the latter against liquid flow between the pump and the motor.

The shaft 29 also carries an armature assembly 35. The armature assembly has a commutator 36 at one end thereof.

Spaced field coils 37 and 38 are mounted in the motor casing 25 around the armature 35. The coils are connected in series by a wire 37a. Commutator brushes 39 and 40 are adjustably carried by and insulated from the end casing 26 of the motor. The motor or prime mover is energized through the field coils and armature by electrical energy supplied through a circuit form a source of electrical energy to be more fully described later herein.

When the motor 11 is energized, the impeller assembly 30 is rotated and the uncovered vane portions 31 beat or agitate the fuel to liberate bubbles of gas and vapor from the fuel which rise through the pond P and burst at the surface thereof to liberate the gas and vapor. The bubble freed or agitated fuel is then immediately pressured by the throat ring covered portions of the vanes 31 into the pumping chamber 14 and thence into the discharge member 15 and delivery line 16. Obviously, the discharge pressure into the delivery line 16 will vary with the speed of the impeller assembly.

The booster pump assembly so far described is particularly adapted for use in aircraft fuel systems to pressure fully liquid fuel to the main fuel pump of the aircraft engine which main fuel pump in turn delivers the fuel under proper pressure to the engine carburetor. When the main fuel pump is operating, the booster pump discharge pressure need not be as great as when the main pump fails and the booster pump must then perform the emergency duty of pressuring the fuel to the carburetor. For normal booster pump operation, when the main fuel pump is operating the motor 11 is connected to a source of electrical energy by the following circuit.

Conductors 41 and 42 are connected to opposite sides of a source of electrical energy, such as a battery (not shown). The conductor 41 may be grounded as at G. A switch $S^1$ is interposed between the conductor 42 and a conductor 43 connected to the field coil 38. The field coil 37 is connected to the commutator brush assembly 39 by means of the conductor 44. The commutator brush assembly 40 is connected to the ground G by means of a conductor 45. Consequently, when the switch $S^1$ is closed, current flows from the source of electrical energy through the conductors 42 and 43 to the field coils 38 and 37, through the conductor 44 to the brush assembly 39 and armature 35, and finally through the brush assembly 40 and conductor 45 to the ground G. The field coils and armature of the motor 11 are thereby energized to rotate the armature and drive the impeller assembly 30 at such a speed as will result in a desired discharge of liquid into the delivery line 16 for normal operation of the pump.

However, when in an emergency, the booster pump is required to supply fuel directly to the engine carburetor should the usual main fuel pump fail in operation, it is necessary to increase the discharge pressure of the fuel delivered to the delivery line 16. The increased discharge pressure should be held within narrow limits for proper carburetor performance.

It is, therefore, desirable to control the increased discharge pressure and to provide means for maintaining this pressure substantially constant. For this purpose, a control device 46, sensitive to differences in the discharge pressure of the pump 10 and the ambient air pressure, is connected to the discharge line from the pump. As shown in Figure 1, the control device 46 is shown as being connected to the delivery line 16, but it is to be understood that such a device may be carried by the pump or its discharged outlet, it only being necessary that the discharge pressure of the pump be exerted against the device.

The device 46 includes a lower casing member 47 having a tubular inlet 48 connected to the delivery line 16 for fluid flow from the delivery line into the casing. There is also provided an upper casing member 49 which is connected to the lower casing member 47 by means of the circumferentially spaced bolts 50. A resilient diaphragm 51 is interposed between the casing members 47 and 49 with its peripheral margin clamped therebetween.

The upper end of the casing member 49 is internally threaded to receive therein an end closure member 52 having openings 53 and 54 for venting the interior of the casing member 49 to the atmosphere.

A valve member 55 is slidable through the end closure member 52 and has a headed end 56 seated against the resilient diaphragm 51. A coil spring 57 embraces the valve member 55 and has one end seated against the end closure member 52 and its other end seated against the headed end 56 of the valve member. Compression of the spring normally holds the headed end of the valve member seated on the resilient diaphragm. The coil spring 57 exerts sufficient pressure to maintain the valve member 55 in the position as illustrated in Figure 1 during the normal operation of the pump in which the motor 11 is energized through the circuit previously described.

If it is desired to increase the discharge pressure of the pump 10 for emergency performance, a portion of the current to the armature 35 of the motor may be shunted around the field coils 37, 38 thereby resulting in weakening the field and increasing the armature voltage both of which result in greater motor speed. For this purpose, there is provided a conductor 58 connected to the conductor 42 and to a switch $S^2$. The switch $S^2$ is interposed between the conductor 58 and another conductor 59 which connects with a resistance coil $R^1$. A conductor 60 connects the resistance $R^1$ with the commutator brush assembly 39.

Connected to the conductor 59 between the resistance $R^1$ and the switch $S^2$ is a conductor 61 adapted to be contacted by a switch $S^3$. The switch $S^3$ is operated by the device 46 and is connected to a conductor 62. A resistance coil $R^2$ is interposed between the conductor 62 and the connection between the resistance $R^1$ and the conductor 60. The two resistance coils $R^1$ and $R^2$ are thus in parallel arrangement.

To increase the speed of rotation of the pump impeller, the switch $S^2$ is closed whereby a portion of the current normally flowing through the conductor 43 to the field coils is shunted around the field coils through conductor 61, switch $S^3$, conductor 62, both coils $R^1$ and $R^2$, and conductor 60 to the armature 35. The field coils will thus receive less current and the motor will speed up to its highest speed.

When the speed of the pump impeller increases to effect a discharge pressure exerted against the diaphragm 51 to overcome compression of the coil spring 57, the member 55 is actuated to open the switch $S^3$. The circuit comprising the conductors 61 and 62 and the resistance $R^2$ is thereby opened, and less current will be shunted around the field coils since the shunted current will pass from the conductor 59 through the resistance $R^1$ only and the speed of the motor and the pump impeller will thereby decrease. Thus, when the switch $S^1$ only is closed, all current passes through the motor field which is in series with the armature and the motor then rotates at the speed at which the impeller assembly discharges fuel into the delivery line for normal operation. However, when the switch $S^2$ is closed (the switch $S^3$ also being closed), the resistances $R^1$ and $R^2$ are in parallel in a shunt circuit which shunts a portion of the current around the field coils thereby weakening the field and increasing the armature voltage to increase the speed of the motor. With the corresponding increase in the rotation of the impeller assembly 30 by the increase in speed of the motor 11, the discharge pressure in the delivery line 16 is also increased to actuate the control device 46 which opens the switch $S^3$. The resistance $R^2$ is thereby cut out, leaving only the resistance $R^1$ in the shunt circuit thus increasing the resistance in the shunt circuit and shunting a lesser portion of the current around the field coils thereby increasing the field strength and decreasing the speed of the motor and the impeller to an intermediate speed above the normal speed as obtained when switch $S^1$ only is closed but below the high speed as obtained when all switches are closed.

As the impeller speed drops, the discharge pressure in the delivery line will also drop until the diaphragm 51 and the spring pressed valve member 55 assume positions as illustrated in Figure 1. The switch $S^3$ then closes and the speed of the motor and impeller is immediately increased. This change in the rotational speeds between intermediate and high speeds will maintain increased pressure in the discharge line within narrow limits and above the normal pressure obtained when only switch $S^1$ is closed.

It is to be noted that the end closure member 52 is adjustable toward and away from the diaphragm 51 in order that the compression of the coil spring 57 be increased or decreased at will. By this adjustment, the maximum discharge pressure of the pump to the delivery line 16 may be controlled as desired inasmuch as the operation of the control device 46 to open and close the switch $S^3$ will be dependent upon the compression exerted by the coil spring 57.

Figure 2 illustrates a modified form of construction in which the fuel tank, the pump, and the driving motor are structurally and functionally the same as illustrated in Figure 1. Like reference numerals, therefore, identify similar parts in both figures.

Both forms of construction include the same circuit for energizing the motor 11 for normal operation. The device of Figure 2, however, provides a modified control device sensitive to the differences in pump discharge pressures and engine manifold pressures.

In the modified device, a control device 46a includes a lower casing 47a having a tubular inlet or nipple connection 48a opening into the delivery line 16. An upper casing member 49a is bolted to the lower casing member by means of circumferentially spaced bolts 50a. A resilient diaphragm 51a is interposed between the casing members and clamped therebetween by the bolts 50a.

The upper end of the casing member 49a is internally threaded to receive therein and an adjustable end closure member 52a having pressure relief openings 53a and 54a therethrough. A valve member 55a has its stem portion slidably projecting through the adjustable end closure member 52a with its headed end 56a seating on the diaphragm 51a. A coil spring 57a embraces the valve member 55a and has one end seated against the adjustable end closure member 52a and its other end seated against the head 56a of the valve member for retaining the latter in its seated position on the diaphragm. Movement of the end closure member 52a toward or away from the diaphragm 51a effects an adjustment of the compression pressure exerted by the coil spring 57a.

The upper end of the casing 49a is externally threaded to receive therearound one end of an elongated cup-shaped cap member 65. The mouth end of the cap member 65 is internally threaded and an annular shoulder 66 is provided on the inner periphery for abutment against the outer end of the casing 49a. The closed end of the cap member 65 has a tubular member 67 extending therefrom. A coupling 68 serves to connect one end of a conduit 69 with the free end of the tubular member 67. Another coupling 70 connects the opposite end of the conduit 69 with an intake manifold 71 of the aircraft engine (not shown). A carburetor 72 is carried by the intake manifold 71 and receives fuel from the tank 12 by means of the delivery line 16 either directly or through an engine driven fuel pump (not shown). A supercharger 73 is connected to the carburetor 72 as shown to pressure air into the carburetor.

The shunt circuit through which the motor 11 is energized from a source of electrical energy for the purpose of increasing the motor and pump impeller speeds includes a resistance R interposed between the conductors 59 and 60. A conductor 61a is connected to the conductor 59 between the switch $S^2$ and the resistance coil R and extends through the cap member 65 into connection with the switch $S^3$ when the latter is in a closed position. The outer end of the switch $S^3$ has a conductor 62a extending therefrom through the cap member 65 and into a tapped connection with the resistance R at any point along the coil intermediate its ends as shown.

Discharge pressure of the pump 10, as exerted through the delivery line 16 and into the control device 46a against the diaphragm 51a, actuates the valve member 55a to open the switch $S^3$ thereby breaking the circuit connection between the conductors 61a and 62a.

Energization of the motor 11 for normal operation is identical with that described with Figure 1. When the switch $S^1$ only is closed, all current passes through the motor field, which is in series with the armature, and the motor rotates at a speed for rotating the impeller assembly 30 to effect a discharge into the delivery line 16 for normal operation of the aircraft.

However, when the switch $S^2$ is closed (switch $S^3$ being closed), current flows through the conductors 61a and 62a and through whatever part of the resistance R that is tapped into the circuit by the contactor on the conductor 62a. This shunt circuit shunts a portion of the current around the field coils and causes the motor to speed up as explained above. As a result of the increase in speed of rotation of the impeller assembly, the discharge pressure to the delivery line 16 is likewise increased. As soon as this increase in discharge pressure, as exerted from the delivery line 16 against the diaphragm 51a, is sufficient to overcome the manifold pressure and compression of the coil spring 57a, the valve member 55a will move upwardly to open the switch $S^3$ thereby breaking the circuit through the conductors 61a and 62a. The current then flowing through the conductor 58, the closed switch $S^2$, and the conductor 59 will pass through the entire length of the resistance coil R thus increasing the resistance in the shunt circuit and shunting a lesser amount of current around the field coils thereby decreasing the speed of the motor and the impeller assembly. This drop in speed of the impeller assembly effects a drop in the discharge pressure to the delivery line 16 until such time as the coil spring 57a can return the diaphragm 51a to its normal position when the switch $S^3$ closes. The circuit through the conductors 61a and 62a is thereby closed to again increase the speed of the motor and the impeller assembly.

Consequently, automatic actuation of the switch $S^3$ to open and closed positions maintains a substantially constant discharge pressure in the delivery line 16, which pressure is dependent upon the adjusted pressure of the coil spring 57a.

It will be noted that the control device 46a has the interior of the cap member 65 thereof in communication with the intake manifold 71 through the conduits 67 and 69. The control device 46a therefore controls the position of the switch $S^3$ automatically by virtue of the changes in discharge pressure from the pump 10 acting through the delivery line 16 and the interior of the casing 47a upon the diaphragm 51a. This pressure, acting in the direction to open the switch $S^3$ and thereby decrease the pump pressure, is counteracted by the manifold pressure acting upon the other side of the diaphragm and the pressure as exerted by the coil spring 57a. The purpose of exerting manifold pressure on the diaphragm instead of ambient air pressure is to make possible a more constant control irrespective of altitude. If the ambient air pressure drops materially, the valve may open the switch at lesser positive pressures in the fuel line since air pressure on the diaphragm is reduced. However, the intake manifold pressure can be kept substantially constant by a supercharger irrespective of altitude. As a result, substantially the same air pressure acts on the diaphragm.

It will be apparent from the foregoing that the present invention provides mechanical and electrical means for a booster pump for effecting different, but substantially constant, discharge pressures from the pump. The electrical system includes a circuit by which the driving motor for the pump is energized for effecting a predetermined and constant discharge pressure required in the normal operation of a vehicle, while an additional circuit is provided by which resistances are automatically selected for effecting a change in the energization of the driving motor resulting in a higher discharge pump pressure of a substantially constant value. Furthermore, the mechanical means includes an adjustable control mechanism sensitive to discharge pressures of the pump and operable for controlling the additional circuit whereby the speed of the motor and the pump impeller driven thereby is automatically regulated.

While particular embodiments only of this invention have been illustrated, it will, of course, be understood that the invention should not be limited thereto, since many other modifications may be made and, therefore, it is contemplated by the appended claims to cover all such modifications as fall within the true spirit and scope of the present invention.

We claim as our invention:

1. The combination with a pump arranged to receive liquid from a source of supply and having a discharge for liquid pressured by said pump, a motor for driving said pump having fluid coils and an armature in series and a control device operable by the discharge pressure of said pump, of an energizing circuit for the field coils and armature of said motor, a shunt circuit including resistances in parallel for shunting a portion of the current in said energizing circuit around the field coils of said motor, and a switch actuated by said control device arranged to cut out one of said resistances and leave another of said resistances connected in series with the armature.

2. In combination, a pump arranged to receive liquid from a source of supply and having a discharge for the liquid pressured by said pump, electrical means for driving said pump, a first electrical circuit through which said electrical means is normally energized from a source of electrical energy for driving said pump in a first speed range to effect a predetermined discharge pressure, a first switch controlling said first circuit, a second electrical circuit for energizing said electrical means to change the driving speed of said pump to a second speed range, a second switch for selectively adding or subtracting said second circuit to and from said first circuit, and a diaphragm actuated switch controlled by the discharge pressure of said pump for selectively controlling the impedance of only said second circuit to control the speed of said electrical means only in said second speed range to maintain a uniform discharge pressure.

3. In combination, a pump arranged to receive liquid from a source of supply and having a discharge for liquid pressured by said pump, an electric motor for driving said pump, a first electrical circuit for operating said motor at normal speed, a second electrical circuit containing resistance means defining a plurality of conducting paths shunting the field of said motor, a switch for connecting said second circuit in shunting relation to the field of said motor to increase the speed of said motor to an above-normal range, and a diaphragm device exposed to the discharge pressure of said pump, said diaphragm device being constructed and arranged to connect or disconnect one of said conducting paths in shunt relation to the field of said motor to regulate the speed of said motor only in said above-normal speed range to maintain a uniform discharge pressure.

4. In combination, a pump arranged to receive liquid from a source of supply and having a discharge for liquid pressured by said pump, an electric motor for driving said pump including a field core and an armature in series therewith, an electrical circuit for operating said motor in a predetermined speed range, a motor field shunt circuit having resistance means therein defining a plurality of conducting paths, a switch for adding said shunt circuit to said electrical circuit to operate said motor in a second predetermined speed range, adjustable control means sensitive to the discharge pressure of said pump and operable thereby, and means operable by said control means for connecting and disconnecting one of said conducting paths to said motor field shunt circuit whereby the speed of said pump is controlled only in said second speed range to maintain a uniform discharge pressure.

5. In combination, a pump, an electric motor for driving said pump, an electrical circuit arrangement associated with said motor including a resistance connected to shunt the motor field, means for selectively cutting said resistance out of and into shunting relation to the motor field to operate said motor in either a first or a second speed range, and means automatically responsive to pressure developed by said pump to vary the effect of said resistance only when it is connected in shunting relation, thereby controlling the speed of said motor only in said second speed range.

THEODORE ROBERT DINSMORE.
JAMES AITKEN THOMPSON.